US010764382B2

(12) United States Patent
Tasharofi et al.

(10) Patent No.: US 10,764,382 B2
(45) Date of Patent: Sep. 1, 2020

(54) SERVER-TO-SERVER INTEGRATION OF TRACKING EVENTS

(71) Applicant: Microsoft Technology Licensing, LLC, Redmond, WA (US)

(72) Inventors: Samira Tasharofi, Sunnyvale, CA (US); Tao Cai, Sunnyvale, CA (US); Yingfeng Oh, Cupertino, CA (US); Robert Wagner, Sunnyvale, CA (US); Pallavi Agarwal, Mountain View, CA (US); Alexandros Ntoulas, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 361 days.

(21) Appl. No.: 15/855,947

(22) Filed: Dec. 27, 2017

(65) Prior Publication Data
US 2019/0199812 A1      Jun. 27, 2019

(51) Int. Cl.
*G06F 15/173*      (2006.01)
*H04L 29/08*       (2006.01)

(52) U.S. Cl.
CPC ......... *H04L 67/22* (2013.01); *H04L 67/1097* (2013.01); *H04L 67/146* (2013.01)

(58) Field of Classification Search
CPC .... H04L 67/22; H04L 67/1097; H04L 67/146

USPC ........................................................ 709/224
See application file for complete search history.

(56) References Cited

U.S. PATENT DOCUMENTS

| 2009/0204704 | A1* | 8/2009 | Muret | H04L 67/22 |
| | | | | 709/224 |
| 2010/0281008 | A1* | 11/2010 | Braunwarth | G06Q 30/00 |
| | | | | 707/705 |
| 2013/0254231 | A1* | 9/2013 | Decker | G06F 16/951 |
| | | | | 707/770 |

* cited by examiner

*Primary Examiner* — Atta Khan
(74) *Attorney, Agent, or Firm* — Hickman Palermo Becker Bingham LLP; Daniel D. Ledesma (57) ABSTRACT

Techniques for integrating two server systems are provided. A first server system receives, from a first computing device, provider data generated by a third-party tracking service. The first server system stores association data that associates the provider data with one or more content items. After storing the association data, the first server system receives, from a second computing device, a message that includes a first identifier and that indicates an event and a content item. In response to receiving the message, the first server system determines whether to report the event to the third-party tracking service. If so, the first server system determines a second identifier based on the first identifier, retrieves, based on the association data and the content item, the provider data that is associated with the content item, and transmits, over a network to the third-party tracking service, the second identifier and the provider data.

18 Claims, 6 Drawing Sheets

SERVER-TO-SERVER INTEGRATION OF TRACKING EVENTS

TECHNICAL FIELD

The present disclosure relates to electronic transmission of digital data over computer networks and, more specifically, to integrating multiple server systems for event tracking. SUGGESTED CLASSIFICATION: 709/203; SUGGESTED ART UNIT: 2447.

BACKGROUND

The Internet allows end-users operating computing devices to request content from many different publishers. Some publishers desire to send additional content items to users who visit their respective websites or who otherwise interact with the publishers. To do so, publishers rely on external content delivery services that deliver the additional content items over one or more computer networks to computing devices of such users.

Some providers of the additional content items rely on multiple content delivery services to electronically distribute their respective content items. Such providers tend to desire how their respective content items perform relative to the different content delivery services. Tracking services have arisen as a central reporting platform to allow providers to check performance of their respective content items without having to interact separately with each content delivery service. However, tracking services rely on data directly from client devices to generate reports, which data tends to be inaccurate much of the time. To further compound the problem, a provider will see discrepancies in a report from a tracking service and a corresponding report from a content delivery service pertaining to how content items from the provider perform relative to the content delivery service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for integrating two server systems for tracking events that occur relative to remote client devices. In an approach, a client device transmits an event (e.g., a click event or an impression event) associated with a content provider to a first server system. The first server system determines whether the event is valid. If so, then the first server system retrieves provider data previously generated by the second server system and received from the content provider. The first server system sends, to a second server system, a message reporting the event along with the provider data. In this way, events reported by both the first server system and the second server system to the content provider will be consistent with each other. Also, by offloading event reporting to the first server system, rendering logic of the client device is greatly simplified, thus reducing the amount of processing required to be performed on the client device. Another technical advantage is that richer event reporting data may be sent to the second server system than if the client device transmitted the event reporting data to the second server system.

System Overview

Figure 1:
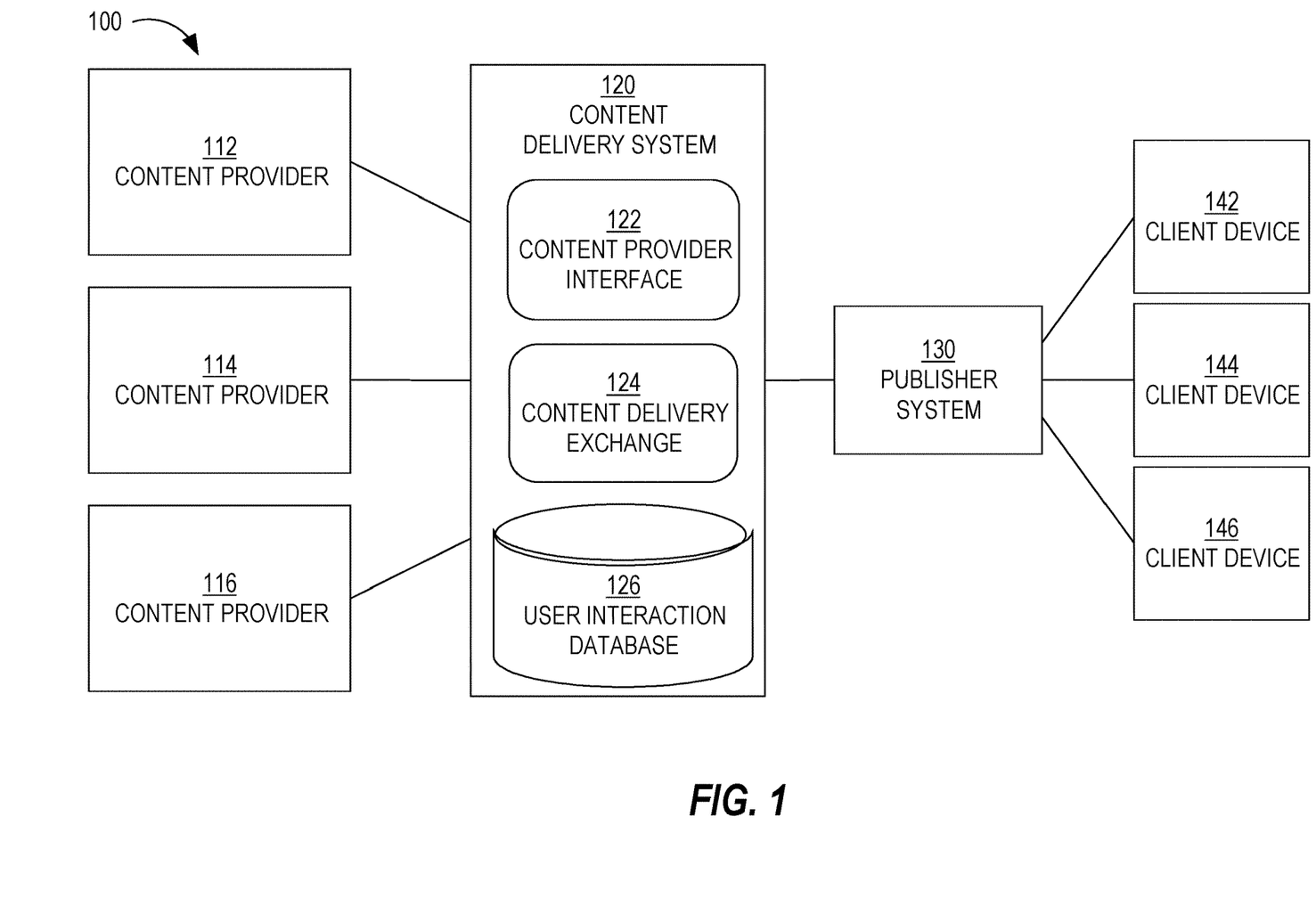
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery system 120 tracks one or more types of user interactions across client devices 142-146 (and other client devices not depicted). For example, content delivery system 120 determines whether a content item that content delivery exchange 124 delivers is presented at (e.g., displayed by or played back at) a client device. Such a "user interaction" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 126.

For example, content delivery system 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a browser cookie. Thus, if content delivery system 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a browser cookie. If impression data items are generated and processed properly, a click data item should be associated with an impression data item that corresponds to the click data item.

Event Reporting System

Figure 2:
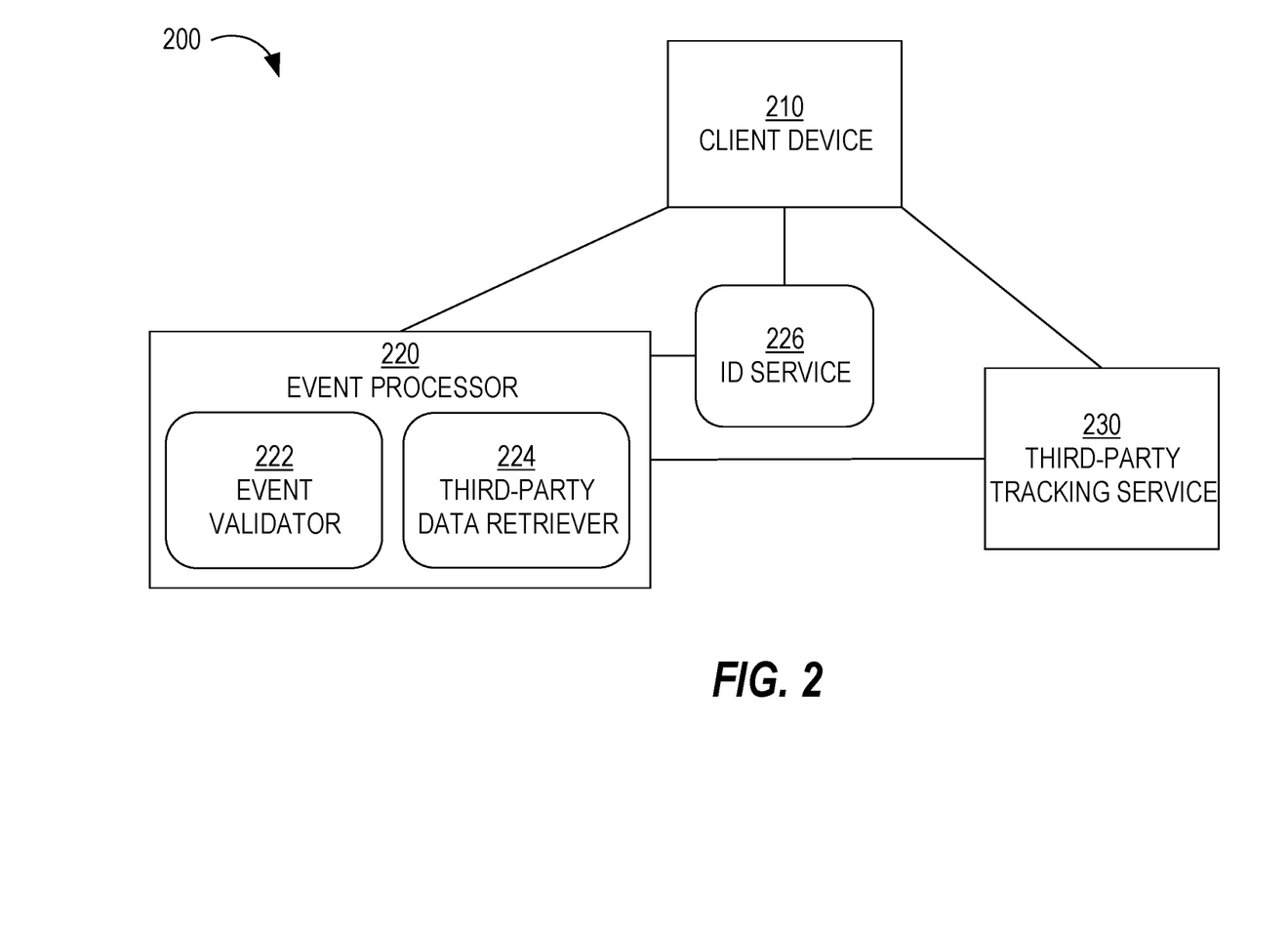
FIG. 2 is a block diagram that depicts an event reporting system, in an embodiment.

FIG. 2 is a block diagram that depicts an event reporting system 200, in an embodiment. Event reporting system 200 includes a client device 210 (e.g., client device 142), an event processor 220, and a third-party tracking service 230. Event processor 220 and third-party tracking service 230 are implemented in hardware, software, or any combination of hardware and software. For example, each of event processor 220 and third-party tracking service 230 may be implemented on one or more server devices. Event processor 220 is remote relative to client device 210 and third-party tracking service 230 and client device 210 is remote relative to third-party tracking service 230.

While only one client device 210 and one third-party tracking service 230 are depicted for ease of explanation, event processor 220 supports many client devices and may interact with multiple third-party tracking service 230.

Client device 210 presents one or more content items that have been selected in one or more content item selection events conducted by content delivery exchange 124. Event processor 220 may be part of content delivery system 120 or may be implemented separate from content delivery system 120, but within the same network. Content delivery exchange 124 and event processor 220 may be within the same web domain.

Client device 210 detects one or more events with respect to the one or more content items and transmits event messages to event processor 220. Although the description herein states that client device 210 detects an event, the detection may be performed by (a) a web browser (e.g., in the context of desktop or laptop computer) executing on client device 210 or (b) a publisher-provided software application (or "app") executing on client device 210, in the context of a mobile device, such as a smartphone or tablet computer. Example events include an impression of a content item, a user click of a content item, a playing of a certain type of video of a content item (out of multiple possible types of videos), a playing of a certain portion of video of a content item, and a playing of a certain portion of audio of a content item. For example, a content item, when displayed on a screen of a computing device, may begin playing video. Client device 210 (or an app or web browser) determines how long the video plays and reports that event to event processor 220.

Each event is associated with a URL that identifies an endpoint of event processor 220. When client device 210 detects an event, a message that includes details about the event is sent, using the URL, to the endpoint. Different types of events may be associated with different URLs. For example, a click event may be associated with a first URL of event processor 220 and an impression event may be associated with a second URL of event processor 220. Alternatively, all types of events are associated with the same URL and the client-generated message includes event type data that indicates the event type.

Event processor 220 receives an event message pertaining to a content item and event validator 222 determines whether the event is valid. A valid event is one that should be reported to a content provider that initiated the content delivery campaign that includes the content item. There are multiple reasons why an event may be invalid, such as the event being a duplicate event and the event pertaining to a content delivery campaign that has expired or has run out of budget. For example, a user may click multiple times on a content item, which would cause multiple click events to be generated. As another example, a content item may have been displayed on a screen of client device 210. Hours later, a user of client device 210 clicks on the content item. However, after the content item selection event occurred and prior to the user clicking on the content item, the corresponding content delivery campaign has run out of budget. In this example, the corresponding content provider should not be charged for the click event and the click event should not be reported to the content provider.

As another example, event scammers may send event messages to event processor 220 without there being corresponding content item selection events. Event validator 222 determines whether the corresponding event is valid. One way to make this determination is for event validator 222 to compare a device identifier of a computing device that sent a scam event message ("sending device") with device identifiers associated with recent content item selection events. If there is no match, then the event message is presumed to be a scam event message and the event is not reported internally or to third-party tracking service 230. Another way to determine whether an event message is a scam message is for event validator 222 to determine whether the device identifier of the sending device is associated with scam activity. If so, then the event message is presumed to be a scam event message and the event is discarded internally (and, for example, not reported to the corresponding content provider) and not reported to third-party tracking service 230.

Another example of an invalid event is one where the event was triggered by an employee of content delivery system 120 and/or publisher system 130. Such events are triggered when employees are testing features of the respective systems, which testing causes content items to be displayed. Such events should not result in charging the corresponding content providers.

Event processor 220 also includes a third-party data retriever 224 that takes, as input, data included in a (valid) event message (e.g., a content item identifier) and, based on a mapping, retrieves corresponding third-party data (or "third-party provider data") that is recognizable to third-party tracking service 230. The third-party provider data is used to uniquely identify the corresponding content provider to third-party tracking service 230 relative to other content providers. For example, third-party provider data for a particular content provider may be used by third-party tracking service 230 to uniquely identify an account associated with the particular content provider. The third-party provider data for a content provider was originally generated by third-party tracking service 230, sent to the content provider, and provided by the content provider to content delivery system 120. Third-party provider data may be embedded in a URL that references third-party tracking service 230. The URL may contain macros that event processor 220 populates before sending the URL to third-party tracking service 230, such as a timestamp, a mobile advertising identifier, an account identifier, a campaign identifier, and a content item identifier. A content provider may be associated with multiple instances of third-party provider data, each instance associated with a different content item.

The mapping may be part of event processor 220 or may be separate from event processor 220. If there are multiple third-party tracking services, then event processor 220 may include (or have access to) a separate mapping for each third-party tracking service.

After third-party data retriever 224 retrieves a third-party provider data, third-party data retriever 224 (or another component of event processor 220) causes an event reporting message that includes the third-party provider identifier to be transmitted over one or more computer networks to third-party tracking service 230. A non-exhaustive list of data items that an event reporting message may include are as follows: a date and/or time timestamp of the event, a publisher identifier (that uniquely identifies the publisher system that caused the corresponding content item to be presented), a campaign identifier that uniquely identifies a content delivery campaign that includes the corresponding content item, and/or a content item identifier that uniquely identifies the corresponding content item.

Third-party tracking service 230 receives event reporting messages from multiple client devices that report events. However, in embodiments herein, third-party tracking service 230 additionally receives event reporting messages from event processor 220.

With a publisher identifier, third-party tracking service 230 is able to aggregate events pertaining to the same publisher and report such aggregations to requesting content providers, which allows content providers to view how their respective content items "perform" on different publisher systems. Content item "performance" may indicate a number of impressions, a number of clicks (or user selections), a user selection rate (or click-through rate (CTR)), or a number of conversions. For example, third-party tracking service 230 may display, to a content provider representative, a first number of clicks through a first publisher system and a second number of clicks through a second publisher system.

With a timestamp, third-party tracking service 230 is able to aggregate events that occurred (or were detected) during a particular time period and report such aggregations to requesting content providers. For example, third-party tracking service 230 may display, to a content provider representative, a CTR of a content item on different particular days, an average impression total of a content item on weekdays, a click total of a content item on weekends, etc.

With a content delivery campaign identifier, third-party tracking service 230 is able to aggregate events that pertain to a particular campaign and report such aggregations to requesting content providers. For example, third-party tracking service 230 may display, to a content provider representative, a first CTR for a first content delivery campaign and a second CTR for a second content delivery campaign.

With a content item identifier, third-party tracking service 230 is able to aggregate events that pertain to a particular content item and report such aggregations to requesting content providers. This may be useful in situations where a content delivery campaign is associated with multiple content items.

Example Process in Mobile Environment

Figure 3:
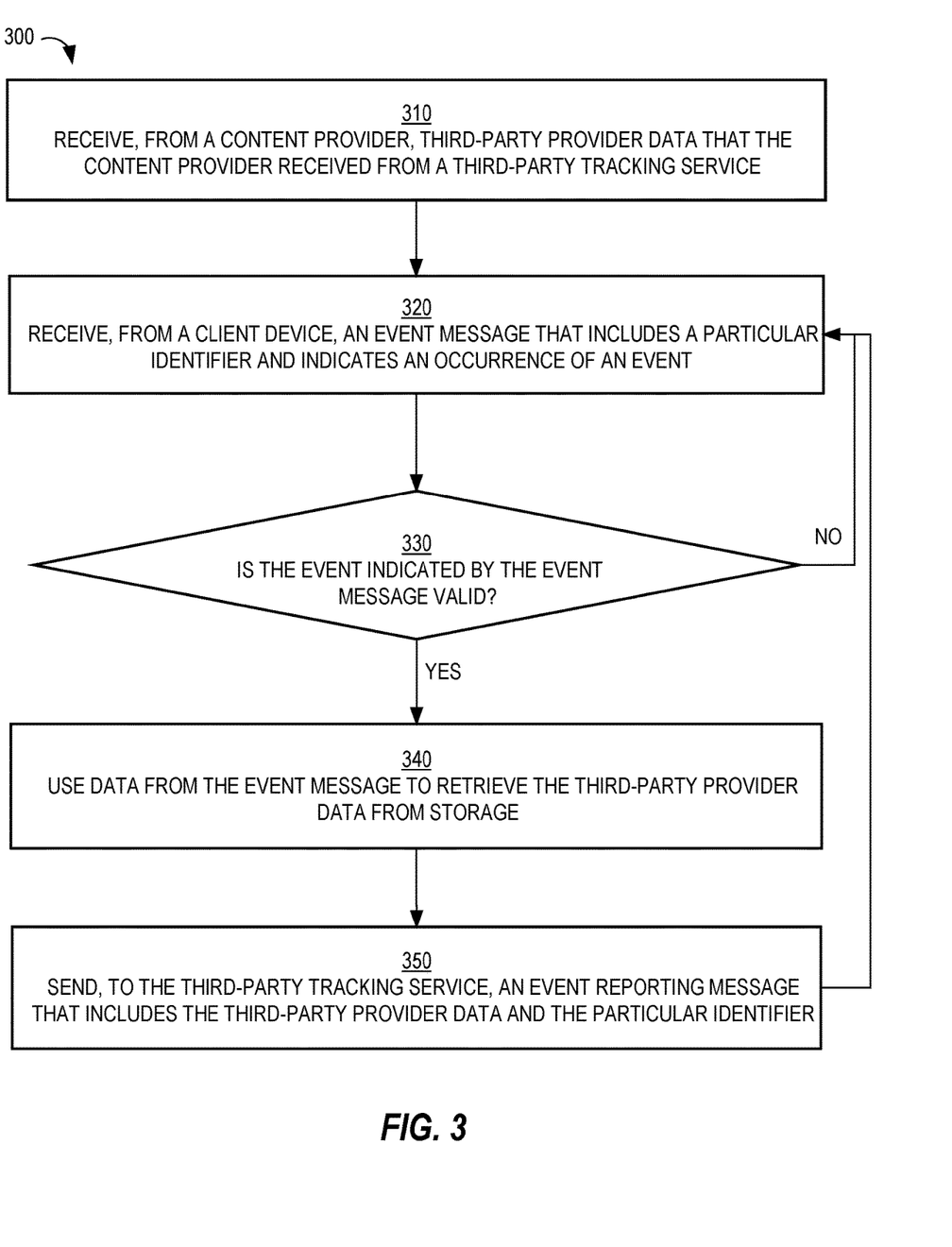
FIG. 3 is a flow diagram that depicts a process for processing events detected in a mobile environment, in an embodiment.

FIG. 3 is a flow diagram that depicts a process 300 for processing events detected in a mobile environment, in an embodiment. Process 300 corresponds to a scenario where a client device has an advertising identifier. Typically, mobile devices, such as smartphones and tablet computers, include an advertising identifier. Some mobile operating systems come with a unique advertising identifier and allow users to, on demand, trigger generating a new random advertising identifier.

At block 310, content delivery system 120 receives, from a content provider (or from a computing device of a representative of the content provider), third-party provider data that the content provider received from third-party tracking service 230. In addition to being used to uniquely identify the content provider to third-party tracking service 230, the third-party provider data may also include values that uniquely identify a content delivery campaign and/or a content item so that the content provider may track content item performance and/or campaign performance at different publisher systems. Content delivery system 120 stores the third-party provider data in a storage location that is accessible to event processor 220. Block 310 may be performed for each content provider that relies on content delivery system 120 to manage its content delivery campaigns and requests that events be reported to a third-party tracking service.

At block 320, event processor 220 receives an event message from client device 210. The event message includes an advertising identifier and one or more parameter values. The parameter values may be included in the destination URL of the event message. The one or more parameters may indicate auction information (e.g., a place/location the content item was shown), viewer IP address information (indicating where the event came from), viewer browser information (e.g., a particular browser of the viewer), a request identifier (e.g., that is unique for each request and that is used to resend an event to third-party tracking service 230 if a prior reporting failed), the type of event (e.g., click, impression, video action, such as play, pause, rewind, forward, change volume), when the event was detected, a publisher identifier, a content delivery campaign identifier, and/or a content item identifier. Not all information (e.g., auction information) is sent to third-party tracking service 230.

At block 330, event processor 220 (or event validator 222) determines whether the event indicated by the event message is valid. If not, then process 300 ends without sending an event reporting message to third-party tracking service 230. Else, process 300 proceeds to block 340.

At block 340, event processor 220 (or third-party data retriever 224) uses data from the event message to retrieve the appropriate third-party provider data (originally received in block 310) from storage. For example, the event message includes a content item identifier and event processor 220 uses the content item identifier to lookup the corresponding third-party provider data.

At block 350, event processor 220 sends (securely) an event reporting message to third-party tracking service 230, either directly or indirectly. The event reporting message includes the advertising identifier, the third-party provider data, and may include the same parameter value(s) included in the event message received in block 310, such as timestamp, viewer IP address information, viewer browser information, and request identifier. If the event reporting message fails to reach third-party tracking service 230 for whatever reason, the request identifier may be used to resend the event reporting message.

While process 300 is depicted and described as occurring in a particular order, all embodiments are not so limited. For example, block 340 may be performed in parallel with or after block 330. Also, an iteration of blocks 320-350 may occur thousands of times for a single iteration of block 310.

Example Process in Browser Environment

Figure 4A:
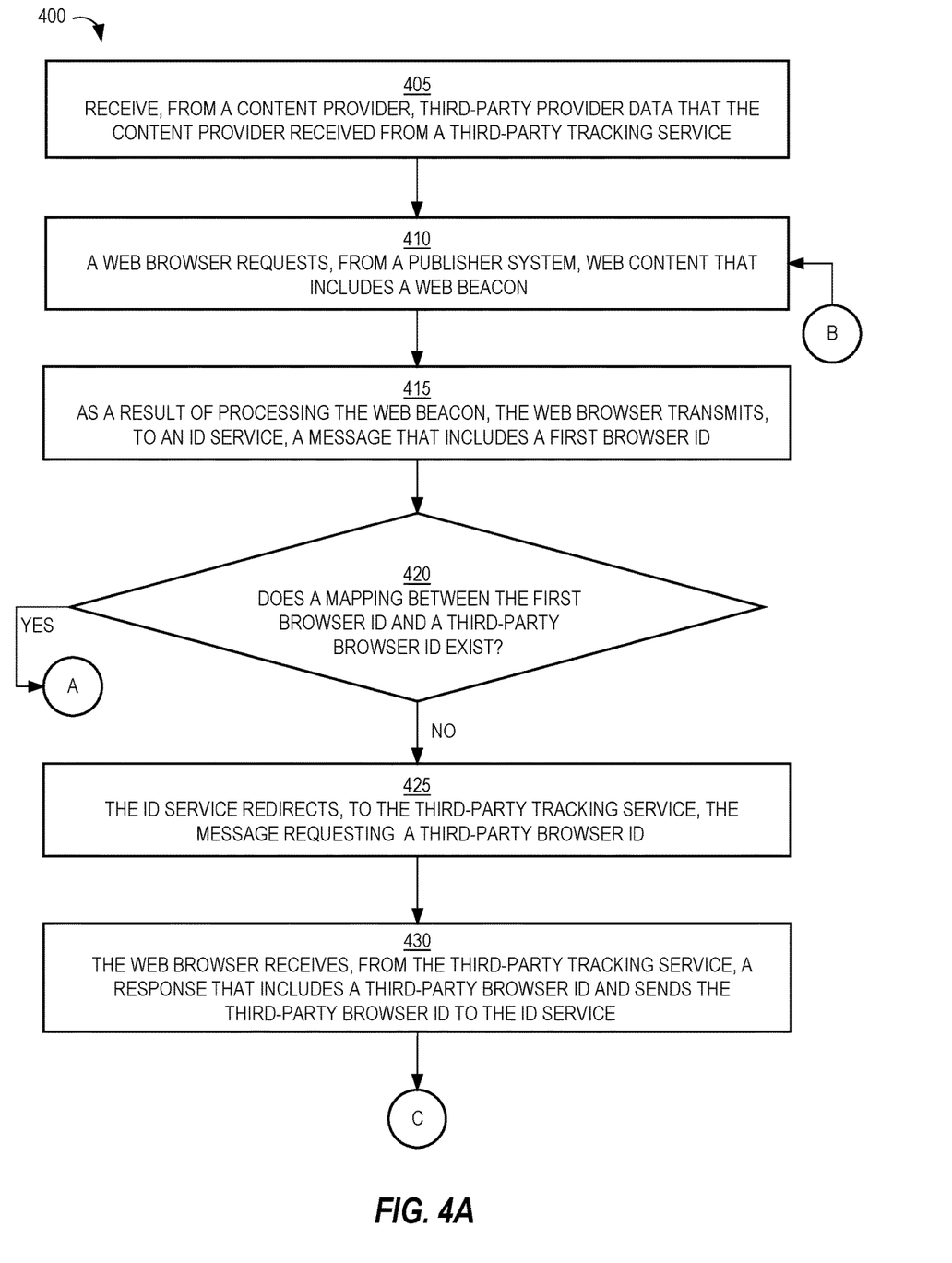
FIGS. 4A-4B are flow diagrams that depict a process for processing events detected in a web browser environment, in an embodiment.
Figure 4B:
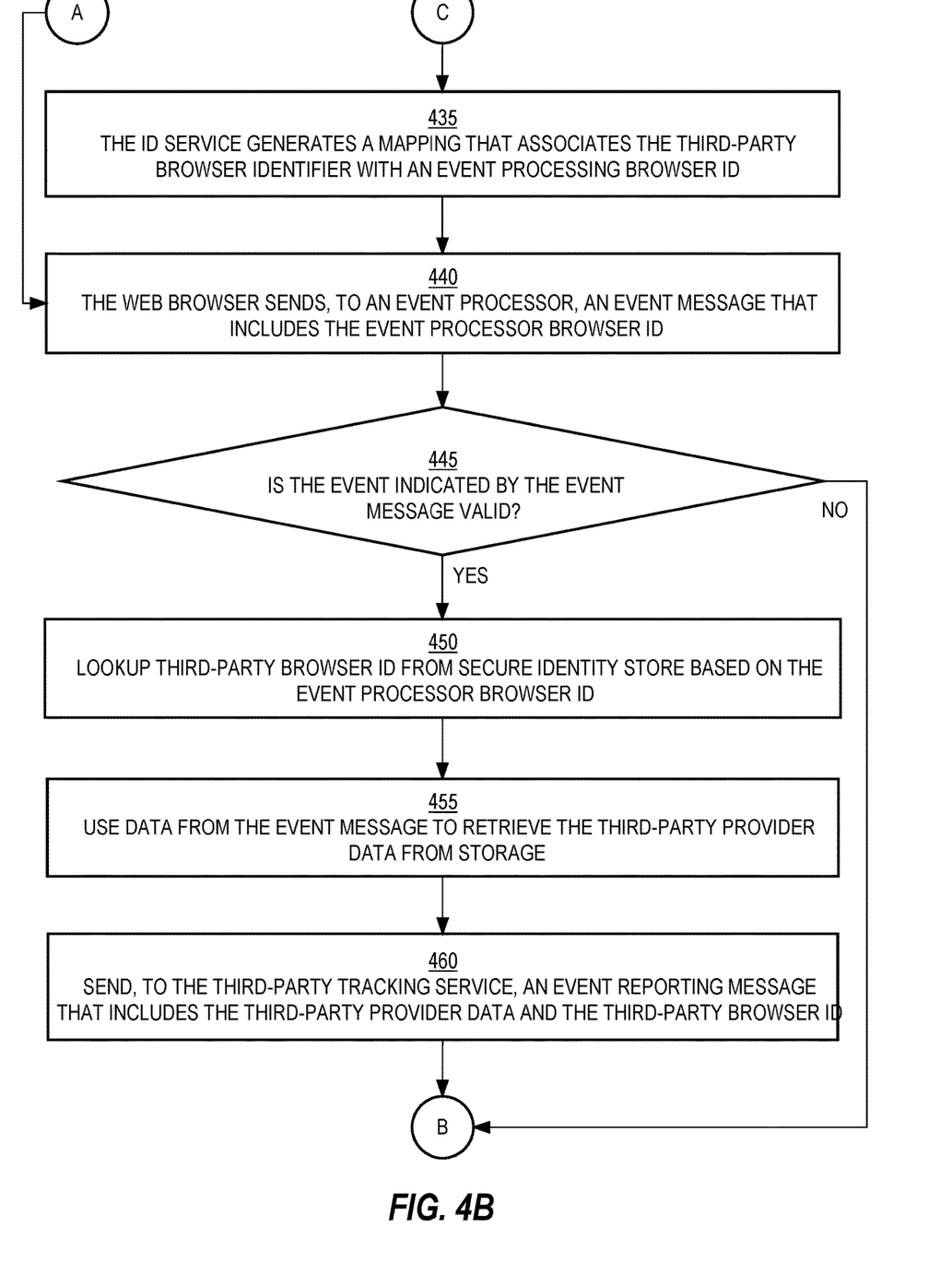

FIGS. 4A-4B are flow diagrams that depict a process 400 for processing events detected in a web browser environment, in an embodiment. Process 400 corresponds to a scenario where a client device does not have an advertising identifier. For example, desktop and laptop computers executing web browsers (e.g., Microsoft Edge, Google Chrome, Apple Safari, and Mozilla Firefox) do not have advertising identifiers. Instead, the web browser has access to browser cookies from different publisher systems. When interacting with a web server of a particular domain, the web browser shares the corresponding domain browser cookie with that web server.

At block 405, content delivery system 120 receives, from a content provider (or from a computing device of a representative of the content provider), third-party provider data that the content provider received from third-party tracking service 230. Block 405 is similar to block 310 described above.

At block 410, a web browser executing on client device 210 requests, from a publisher system that is in the same domain as event processor 220, web content that includes a tracking pixel or web beacon, such as in the footer of a web page. A web beacon is any of a number of techniques used to track who is reading certain content (e.g., a web page or email), when the content was read/loaded, and from which client device. A web beacon can be used to send data to a web server prior to the loading of an HTML document without delaying the loading and affecting the perception of page load performance for the next navigation. If content delivery exchange 124 delivered the content item off-network (i.e., to a third-party publisher system), then the content item includes a similar web beacon that results in the same process as follows.

At block 415, upon loading the web content (or upon detecting an event related to the content item, in the case of off-network content items), the web browser processes the web beacon, which causes the web browser to transmit an ID message to ID service 226, which may be part of event processor 220 or separate from event processor 220, but in the same domain as event processor 220. The ID message may include a browser identifier that uniquely identifies a browser that initiated the call to ID service 226 and that is specific to the domain of event processor 220. This browser identifier is also referred to herein as an "event processing browser identifier."

At block 420, ID service 226 determines whether a mapping between the event processing browser identifier and the appropriate third-party browser identifier exits. Third-party browser identifiers originate from third-party tracking service 230. Such a mapping may be stored in a secure identity store (not depicted) that stores multiple mappings, where each mapping associates an event processing browser identifier with one or more third-party browser identifiers. Such a mapping may exist in the secure identity store if the mapping was created in the last, for example, 90 days. Thus, block 420 may also involve determining whether the third-party browser identifier has expired. Such expiration information may be stored in the browser cookie or in ID service 226.

A third-party browser identifier may be a hashed version of an actual third-party browser identifier in order to increase the security of any data corresponding to the actual third-party browser identifier.

If a third-party browser identifier is not associated with the entity processor browser identifier in the secure identity store (or the third-party identifier has expired), then process 400 proceeds to block 425. Otherwise, process 400 proceeds to block 440.

In some situations, no event processing browser identifier exists, such as after a user of client device 210 causes the web browser to a flush a cookie cache or if this is the first time the user is using the web browser. In such situations, the ID message transmitted in block 420 does not include an event processing browser identifier. Instead, ID service 226 determines that the ID message does not include an event processing browser identifier and, instead, retrieves an event processing browser identifier for the web browser executing on client device 210 and causes the web browser to store that event processing browser identifier. Such retrieval may involve calling a browser identifier generation service (not depicted) in order to retrieve a unique event processing browser identifier.

At block 425, ID service 226 redirects the web browser to third-party tracking service 230, thus, requesting a third-party browser identifier. Redirecting involves informing the web browser to send a message to third-party tracking service 230. This message may be an HTTP/HTTPS call (URL) to third-party tracking service 230 and includes, in the message header, a partner identifier and a third-party cookie of service 230. Third-party tracking service 230 uses the partner identifier to verify the partner (note that this API is accessible only for partners that have an agreement with third-party tracking service 230 for cookie matching) and identifies, from the third-party cookie, the user and returns an obfuscated third-party browser identifier to the web browser.

At block 430, the web browser receives, from third-party tracking service 230, a response that includes a third-party browser identifier and sends the third-party browser identifier and an event processor browser identifier to ID service 226. Such logic for receiving and sending the third-party browser identifier may be implemented using a redirect URL that points to ID service 226. Thus, third-party tracking service 230 redirects the web browser to ID service 226.

At block 435, ID service 226 updates the secure identity store with a mapping that associates the third-party browser identifier with an event processing browser identifier associated with the web browser of client device 210.

At block 440, the web browser sends, to event processor 230, an event message that includes the event processor browser identifier.

At block 445, event validator 232 determines whether the event indicated by the event message is valid. If so, then process 400 proceeds to block 450.

At block 450, event processor 220 uses the event processor browser identifier to lookup a mapping in the secure identity store. Because the existence of the mapping was confirmed previously (in block 420 or in block 435), block 450 results in retrieving the appropriate third-party browser identifier. Event processor 220 may call ID service 226 to retrieve the third-party browser identifier.

At block 455, third-party data retriever 224 uses data from the event message to retrieve the appropriate third-party provider data (originally received in block 405) from storage. Block 455 is similar to block 340 described above.

At block 460, event processor 220 sends (securely), to third-party tracking service 230, an event reporting message that includes the third-party browser identifier, the third-party provider data along with any other parameter values required by the corresponding content provider and/or by third-party tracking service 230. If the event reporting message fails to reach third-party tracking service 230 for whatever reason, a request identifier in the event reporting message may be used to resend the event reporting message.

While process 400 is depicted and described as occurring in a particular order, all embodiments are not so limited. For example, block 450 may be performed in parallel with or after block 455. Also, an iteration of blocks 410-460 may occur thousands of times for a single iteration of block 405.

Alternative Approaches for Retrieving a
Third-Party Browser Identifier

In an alternative approach, in response to detecting an event, client device 210 sends, to third-party tracking service 230, a message that requests a third-party browser identifier for the web browser of client device 210, receives the third-party browser identifier from third-party tracking service 230, and passes the third-party browser identifier in an event message sent to event processor 220. Event processor 220 ensures that an event reporting message sent to third-party tracking service 230 includes the third-party browser identifier. However, a downside to this approach is that every detected event results in a call to third-party tracking service 230. Such repeated calling results in delay in tracking calls and is more prone to errors.

In an alternative approach, a web beacon is included in each web page (e.g., in the footer of the web page) and client device 210 sends, to third-party tracking service 230, a message that requests a third-party browser identifier for client device 210 and stores the third-party browser identifier in an event processor browser cookie owned or managed by the entity that operates event processor 220. The event message sent to event processor 220 from client device 210 includes the third-party browser identifier, which is passed along in an event reporting message from event processor 220 to third-party tracking service 230. This approach has some advantages over the prior approach. For example, a separate call from client device 210 for each detected event is unnecessary. Instead, the call from client device 210 to third party tracking service 230 is only made if the domain-specific cookie is not set with the third-party identifier or has expired (e.g., 90 days after first retrieving the third-party identifier). However, this approach is less secure in that services other than event processor 220 need access to the third-party browser identifier.

Publish-Subscribe Event Reporting

In an embodiment, event processor 220 (or an associated component) implements a publish-subscribe system to send event reporting messages to third-party tracking service 230. Event processor 220 generates an event and publishes the event on a particular channel or topic created in a publish-subscribe system, an example of which is Kafka. The event includes the advertising identifier (in case of mobile environment) or a third-party browser identifier (in case of browser environment). The event also includes third-party provider data that third-party tracking service 230 provided to the corresponding content provider initially and the content provider eventually provided to content delivery system 120.

A subscriber of the particular channel or topic executes on a separate device that acts as a proxy for outgoing messages to off-network destinations. A purpose of the proxy is to add additional security to the overall system and/or to off-load less important or less critical tasks to a separate device so as to not affect the processing capabilities of event processor 220.

The subscriber retrieves the event from the particular channel or topic. The subscriber generates an event reporting message that includes the advertising identifier (or the third-party browser identifier), the third-party provider data, and any of the information described previously for including in an event reporting message. The subscriber transmits the event reporting message to third-party tracking service 230.

In some situations, third-party tracking service 230 might not receive an event reporting message for various reasons, such as a network error or a server error associated with third-party tracking service 230. If the subscriber detects that third-party tracking service 230 did not receive an event reporting message, then the subscriber may notify event processor 220 about the details by publishing an event on an error channel/topic to which event processor 220 subscribes. Event processor 220 may choose to generate another (identical) event and publish that event to the particular channel/topic. Alternatively, instead of notifying event processor 220, the subscriber may retry sending the event reporting message until the subscriber detects that third-party tracking service 230 received the event reporting message. In either scenario, as noted previously, an event reporting message may include a request identifier that is used to internally track an event reporting message. An error message may include the request identifier and allow the corresponding event reporting message to be transmitted again to third-party tracking service 230.

Technical Improvements

Embodiments described herein result in multiple technical improvements over prior approaches for reporting events to third-party tracking systems. First, there is reduced technical complexity in the client, which report events to content delivery system 120 anyway. Second, a third-party tracking system receives much more accurate event reporting from content delivery system 120 than from clients, which are likely to report invalid reports. In this way, reports generated for a content provider by a third-party tracking system and reports generated for the content provider by content delivery system 120 will be consistent. Third, events that occur off-network (e.g., relative to third-party publishers) can be reported; whereas, previously, it was difficult for events that occurred off-network to be reported to third-party tracking systems.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
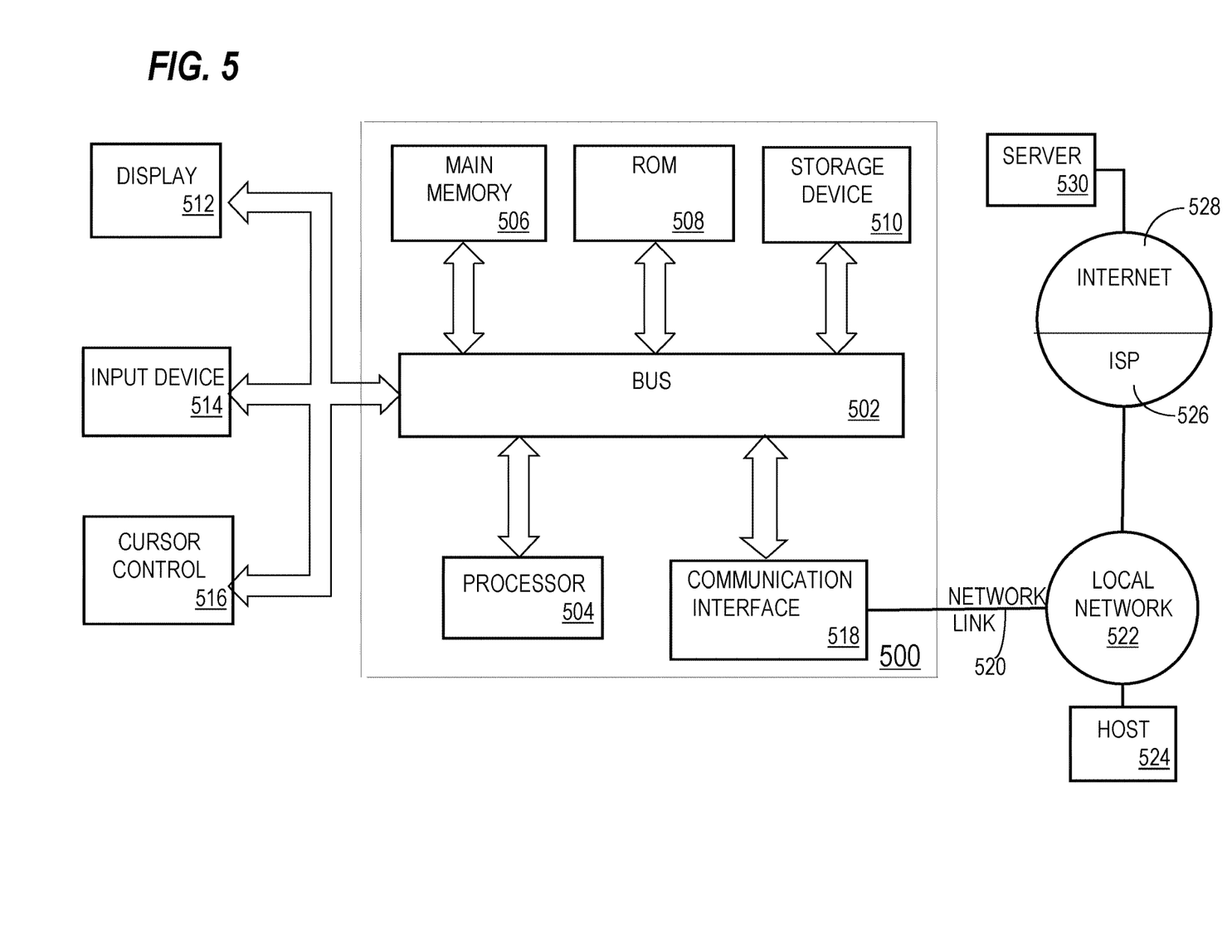
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a first computing device of a content provider, provider data generated by a third-party tracking service that is different than the content provider;
   storing association data that associates the provider data with one or more content items provided by the content provider;
   after storing the association data, receiving, from a second computing device that is different than the first computing device, a first message that includes a first identifier and that indicates an event with respect to a content item of the one or more content items;
   in response to receiving the first message, determining whether to report the event to the third-party tracking service;
   in response to determining to report the event:
      determining a second identifier based on the first identifier;
      based on the association data and the content item, retrieving the provider data that is associated with the content item;
      transmitting, over a network, to the third-party tracking service, the second identifier and the provider data;
   after storing the association data, receiving, from a third computing device that is different than the first computing device, a second message that indicates a second event;
   determining to not report the second event to the third-party tracking service;
   wherein the method is performed by one or more computing devices.

2. The method of claim 1, wherein the second computing device is a mobile device, wherein the first identifier and the second identifier are the same.

3. The method of claim 1, further comprising, prior to receiving the first message:
receiving, from the second computing device, a third message that includes a third identifier;
in response to receiving the third message, retrieving, based on the third identifier and an identifier mapping, the second identifier and transmitting the second identifier to the second computing device.

4. The method of claim 3, wherein the third identifier is stored in a browser cookie on the second computing device.

5. The method of claim 1, further comprising, prior to receiving the first message:
receiving, from the second computing device, a third message that includes a third identifier;
determining whether the third identifier is associated with a corresponding identifier mapping.

6. The method of claim 5, further comprising:
in response to determining that the third identifier is not associated with an identifier mapping, causing a call to be made to the third-party tracking service to retrieve an identifier for the second computing device;
wherein the identifier for the second computing device is the second identifier.

7. The method of claim 5, further comprising:
in response to determining that the third identifier is associated with the identifier mapping, determining whether a timestamp associated with the identifier mapping has expired;
in response to determining that the timestamp as expired, causing a call to be made to the third-party tracking service to retrieve an identifier for the second computing device;
wherein the identifier for the second computing device is the second identifier.

8. The method of claim 1, further comprising:
generating a particular event for a publish-subscribe mechanism, wherein the particular event includes the second identifier and the provider data;
sending the particular event on a particular publish-subscribe channel;
selecting, by a subscriber of the particular publish-subscribe channel, the particular event;
generating, by the subscriber, a third message that includes the second identifier and the provider data;
wherein transmitting the second identifier and the provider data over the network to the third-party tracking service comprises transmitting the third message by the subscriber.

9. The method of claim 8, further comprising:
after transmitting the third message, receiving a response to the third message, wherein the response indicates that the third-party tracking service did not process the third message;
in response to receiving the response, generating a fourth message that includes the second identifier and the provider data;
transmitting the fourth message over the network to the third-party tracking service.

10. One or more storage media storing instructions which, when executed by one or more processors, cause:
receiving, from a first computing device of a content provider, provider data generated by a third-party tracking service that is different than the content provider;
storing association data that associates the provider data with one or more content items provided by the content provider;
after storing the association data, receiving, from a second computing device that is different than the first computing device, a first message that includes a first identifier and that indicates an event and a content item;
in response to receiving the first message, determining whether to report the event to the third-party tracking service;
in response to determining to report the event:
determining a second identifier based on the first identifier;
based on the association data and the content item, retrieving the provider data that is associated with the content item;
transmitting, over a network, to the third-party tracking service, the second identifier and the provider data;
after storing the association data, receiving, from a third computing device that is different than the first computing device, a second message that indicates a second event;
determining to not report the second event to the third-party tracking service.

11. The one or more storage media of claim 10, wherein the second computing device is a mobile device, wherein the first identifier and the second identifier are the same.

12. The one or more storage media of claim 10, wherein the instructions, when executed by the one or more processors, further cause, prior to receiving the first message:
receiving, from the second computing device, a third message that includes a third identifier;
in response to receiving the third message, retrieving, based on the third identifier and an identifier mapping, the second identifier and transmitting the second identifier to the second computing device.

13. The one or more storage media of claim 12, wherein the third identifier is stored in a browser cookie on the second computing device.

14. The one or more storage media of claim 10, wherein the instructions, when executed by the one or more processors, further cause, prior to receiving the first message:
receiving, from the second computing device, a third message that includes a third identifier;
determining whether the third identifier is associated with a corresponding identifier mapping.

15. The one or more storage media of claim 14, wherein the instructions, when executed by the one or more processors, further cause:
in response to determining that the third identifier is not associated with an identifier mapping, causing a call to be made to the third-party tracking service to retrieve an identifier for the second computing device;
wherein the identifier for the second computing device is the second identifier.

16. The one or more storage media of claim 14, wherein the instructions, when executed by the one or more processors, further cause:
in response to determining that the third identifier is associated with the identifier mapping, determining whether a timestamp associated with the identifier mapping has expired;
in response to determining that the timestamp as expired, causing a call to be made to the third-party tracking service to retrieve an identifier for the second computing device;

wherein the identifier for the second computing device is the second identifier.

17. The one or more storage media of claim 10, wherein the instructions, when executed by the one or more processors, further cause:
   generating a particular event for a publish-subscribe mechanism, wherein the particular event includes the second identifier and the provider data;
   sending the particular event on a particular publish-subscribe channel;
   selecting, by a subscriber of the particular publish-subscribe channel, the particular event;
   generating, by the subscriber, a third message that includes the second identifier and the provider data;
   wherein transmitting the second identifier and the provider data over the network to the third-party tracking service comprises transmitting the third message by the subscriber.

18. The one or more storage media of claim 17, wherein the instructions, when executed by the one or more processors, further cause:
   after transmitting the third message, receiving a response to the third message, wherein the response indicates that the third-party tracking service did not process the third message;
   in response to receiving the response, generating a fourth message that includes the second identifier and the provider data;
   transmitting the fourth message over the network to the third-party tracking service.

* * * * *